United States Patent [19]
Nishi et al.

[11] 3,938,572
[45] Feb. 17, 1976

[54] CRACK PREVENTION FOR PNEUMATIC TIRE

[75] Inventors: Takuji Nishi, Isehara; Kenhachi Mitsuhashi; Tadanobu Nagumo, both of Hiratsuka, all of Japan

[73] Assignee: The Yokohama Rubber Co. Ltd., Japan

[22] Filed: Dec. 6, 1974

[21] Appl. No.: 530,283

[30] Foreign Application Priority Data
Dec. 31, 1973  Japan.................................. 48-1337

[52] U.S. Cl........................ 152/209 R; 152/DIG. 4
[51] Int. Cl.²......................................... B60C 11/12
[58] Field of Search....... 152/209 R, 209 D, DIG. 3, 152/DIG. 4

[56] References Cited
UNITED STATES PATENTS
2,696,863   12/1954   Ewart et al...................... 152/209 R FOREIGN PATENTS OR APPLICATIONS
527,015   10/1940   United Kingdom............. 152/209 R
2,086,748   12/1971   France............................ 152/209 R

*Primary Examiner*—Drayton E. Hoffman
*Assistant Examiner*—Larry H. Martin
*Attorney, Agent, or Firm*—Kane, Dalsimer, Kane, Sullivan and Kurucz

[57] ABSTRACT

A pneumatic tire provided with a plurality of slots which are provided in tread grooves and extend in the transverse direction of the grooves but at a suitable spacing from each other for the purpose of confining between the slots the growth of cracks produced in the grooves, so that each crack is prevented from growing up to an extent exceeding the spacing between the slots.

3 Claims, 9 Drawing Figures

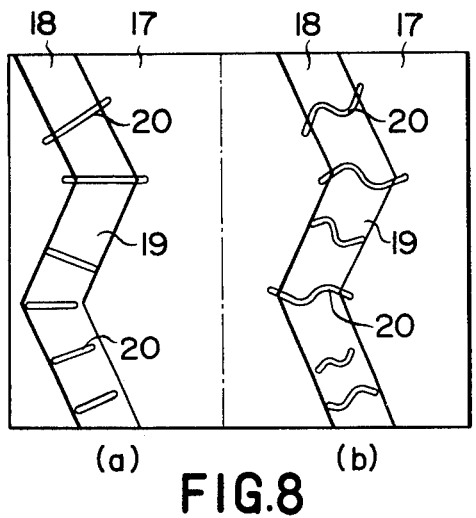
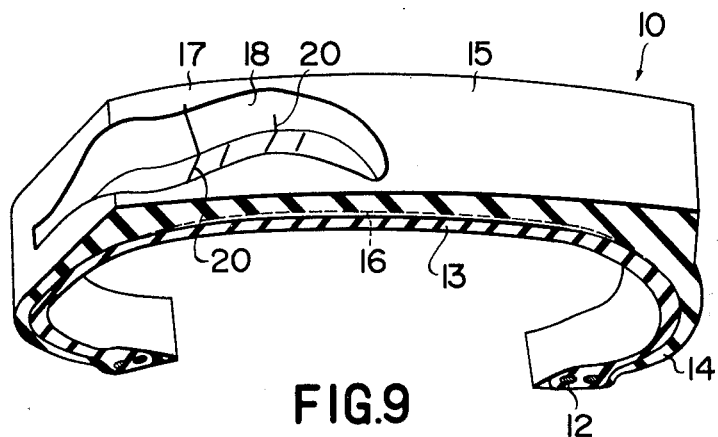

CRACK PREVENTION FOR PNEUMATIC TIRE

BACKGROUND OF THE INVENTION

Field of the Invention

This invention relates to a pneumatic tire and more particularly to a pneumatic tire for suppressing or preventing the growth of cracks developing in tread grooves.

In general, with the pneumatic tire having a tread pattern of a rib type or a lug type, it has been experienced that there have inevitably developed a plurality of minute or hair cracks at the stress-concentrating points in the grooves due to injuries caused by stepping on a nail or a sharp edged stone during the service of a tire or due to the chemical deterioration or fatigue of tread rubber due to the action of ozone. More particularly, since a tension is applied to the bottom portions of tire grooves having a tread pattern of a rib type in the widthwise direction of a tire, i.e., in the direction of a rotary axis of a tire, there are produced stress concentrations at the ends of cracks, resulting in promoting the growth of cracks produced in the grooves in the lengthwise direction thereof. In this manner, the cracks grow up gradually with the use of a tire, eventually resulting in vital damages for a tire, such as tread separation, rib tearing, burst and the like.

There have been proposed many attempts which prevent the growth of cracks developing in tread grooves. The measures taken as those attempts are (1) considerations given to the composition of the tread material consisting of rubber composition so as to afford the crack-growth-resisting property thereto, (2) cyclical change in the level of the bottom portions of the grooves by providing corrugated bottom portions for the grooves A, as shown in cross section in FIG. 1 or projecting portions B of ribs which are formed on the side walls of grooves A and have obtuse corners as shown in FIG. 2, rather than the use of the ribs having acute corners, thereby avoiding the stress concentrations, and (3) considerations in design of the profile of the entire tire so as to avoid the stress concentration in the bottom portions of the grooves, etc. However, it was found that those attempts have met only partial success in preventng cracks.

It is a principal object of the present invention to provide a tire which prevents vital damages or injuries due to the growth of cracks created in the tread grooves.

SUMMARY OF THE INVENTION

According to the present invention, there is provided a pneumatic tire in which a plurality of slots provided in tread grooves extend in the transverse direction of the grooves but at a suitable spacing from each other for the purpose of confining the growth of cracks in the grooves between the slots, whereby the cracks will not grow to a degree that exceeds the spacing between the slots, i.e., that may be deemed as a vital damage for the tire. This confines within a given range the distribution of the stress concentrations which promote the growth of cracks developing in the bottom portions of a tire, thereby preventing the propagation of the stress concentrations beyond such range or confine.

These and other features and objects of the present invention will be apparent from a reading the ensuing part of the specification in conjunction with the accompanying drawings which indicate the embodiments of the present invention.

BRIEF DESCRIPTION OF THE DRAWINGS

FIG. 8 is a partial plan view of a tire tread showing various configurations of slots which are provided in the tire grooves for interrupting the propagation of stress; and FIG. 9 is a partial perspective view of a pneumatic tire having a lug type tread pattern, embodying the present invention.

DESCRIPTION OF THE PREFERRED EMBODIMENTS

Figure 1:
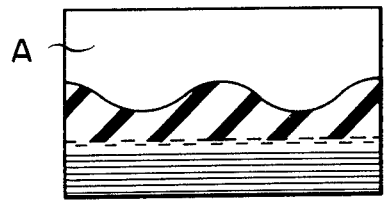
FIGS. 1 and 2 are partial cross-sectional and plan views of the prior art tread pattern which is intended to avoid the stress concentration in the tread grooves of a pneumatic tire, respectively.
Figure 2:
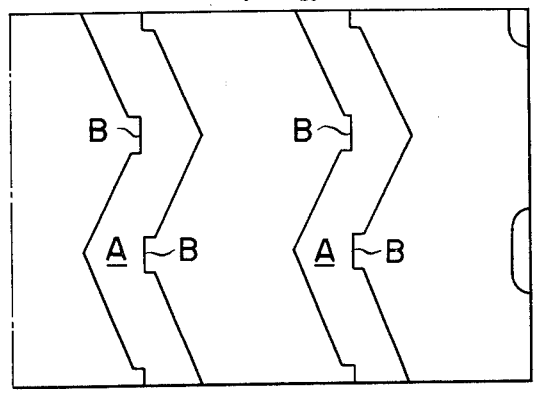
Figure 3:
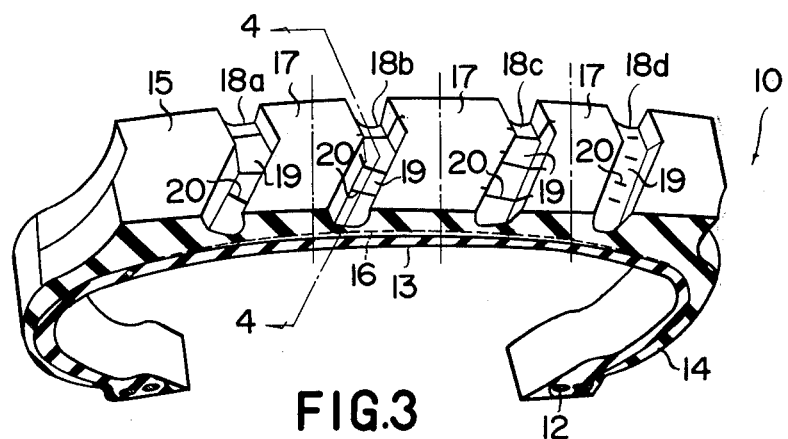
FIG. 3 is a partial perspective view of a pneumatic tire having a rib type tread pattern, embodying the present invention.

A tire shown in FIG. 3 is of a general construction of the conventional tire of this kind, which includes beads 12, a carcass 13 terminating at the respective beads 12, side walls 14, a tread 15 and a breaker 16 serving as a reinforcing layer between the carcass 13 and the tread 15. The tire shown is provided with a rib type tread pattern, with a plurality of ribs 17 extending in the rotating direction of the tire, while grooves 18, (18a to 18d) are defined between the adjoining ribs 17.

Figure 4:
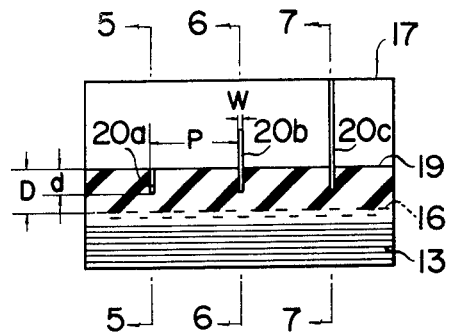
FIG. 4 is a cross-sectional view of the pneumatic tire, taken along the line 4—4 of FIG. 3.
Figure 5:
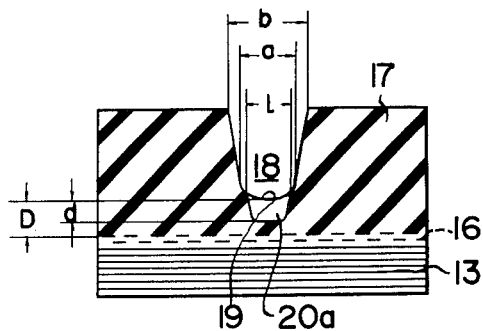
FIG. 5 is a cross-sectional view taken along the line 5—5 of FIG. 4.
Figure 6:
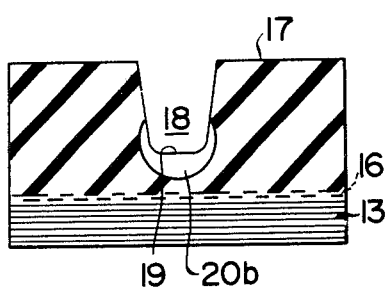
FIG. 6 is a cross-sectional view taken along the line 6—6 of FIG. 4.
Figure 7:
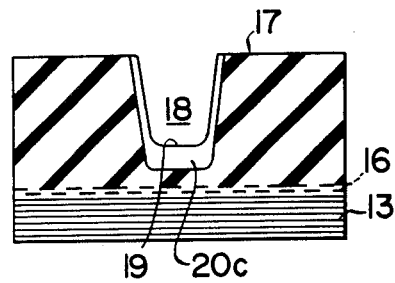
FIG. 7 is a cross-sectional view, taken along the line 7—7 of FIG. 4.

Provided in bottom portions 19 of the respective grooves are a plurality of stress interrupting slots 20 which extend in the transverse direction at a right angle to the lengthwise direction of the grooves, i.e., in the lengthwise direction of the grooves. There are shown in FIG. 3 slots 20 having varying lengths and provided in the respective grooves 18a to 18d. However, this is intended to give such variations in a single figure, and thus it should not be construed that the arrangement of the slots having varying lengths for the respective grooves of the tire are necessary for practicing the present invention. The slots 20 are generally provided in the bottom portions 19 of the grooves, since cracks are apt to take place in the bottom portions of the tread grooves. However, the lengths (FIG. 5) of the slots 20 may be equal to the width of the groove, as in the slots 20 provided in the groove 18a shown in FIG. 3. Alternatively, as shown in slots 20 provided in the grooves 18b and 18c, the lengths of the slots 20 may extend from the bottom portions of the grooves to the wall portions thereof, for coping with the cracks developing in the aforesaid wall portions and growing along the wall portions. Still furthermore, as in the slots 20 provided in the groove 18d, the lengths of the slots may be such as those located in the center portion of the grooves and short of the widths of the grooves. In other words, the length 1 of the slots 20a is shorter in dimension than the width a (FIG. 5) of the grooves. Yet furthermore, as shown in FIGS. 4, 6 and 7, the lengths of the slots 20b may extend up to the mid-point of the walls of grooves, while the slots 20c may extend up to the top edges of the walls of the grooves, i.e., the top surface of the tread, that is, the top surface of the rib 17. Still alternatively, those types of slots may be combined for use for a single groove 18b (FIG. 3) or for a single tire. It is preferable that the lengths of the slots be selected depending on the types of expected cracks, whose types are governed by the shapes and widths of grooves that are determined by the types and sizes of the tires.

Meanwhile, the depths of the slots should be greater than those of the cracks which would be normally caused for the aforesaid reasons. This is particularly important to insure interruption or stoppage of the propagation of cracks beyond the slots. However, the depths of slots should not be such as those reaching the reinforcing layers such as breaker 16 or carcass 13. This gives damages to the breaker or carcass, with the attendant failure to insure safety of a tire itself. Accordingly, it is desirable that the minimum depth be somewhat greater than 1 mm of crack depth which would be normally expected in the bottom portions of grooves. On the other hand, it is preferable that the maximum depth of the slot should be less than 4/5 D. In this respect, meant by D (FIG. 5) herein is a distance covering from the bottom portion of the groove to the top boundary of the breaker 16. The above limitation of 4/5 D is determined from the results of experiments for preventing damages in the breaker due to concentrated stresses of a value exceeding the design value, which stresses are caused due to the interferance between the stress normally produced in the neighborhood of the bottom of a groove and the stress normally produced in the neighborhood of a breaker. For the aforesaid reasons, the depth $d$ of slot 20 should fall in the range of 1 mm $\leq d \leq 4/5$ D. The value of the depth of a slot which is deemed as being most reasonable from viewpoint of the practical application is about ½ D.

The width $w$ (FIG. 4) of the slot 20 should be not more than 2 mm, preferably about 1 mm, for avoiding the widthwise enlargement of the slot provided in the bottom portion of a groove due to the tension acting in the circumferential direction of a tire. In case the width $w$ exceeds 2 mm, then there occurs a tendency for cracks to take place in the neighborhood of the slot 20.

The pitch $p$ (FIG. 4) of the slot 20 depends on the dimension of cracks allowable for a specific tire from viewpoint of the performance thereof. Cracks of a length less than 5 mm is considered not to be harmful for the performance of a tire. On the other hand, when the pitch of the slots is less than 5 mm, the bottom portion of the grooves is possibly damaged, when a molded tire is taken out from a vulcanization-molding machine. For this reason, the minimum value of the pitch $p$ of the slot should be 5 mm. On the other hand, the cracks of a length exceeding 20 mm is a vital defective for the performance of a tire, so that the maximum value of the length of cracks should be 20 mm. Thus, the pitch $p$ should be limited within the range of from 5 mm to 20 mm.

The slot 20 has a U-shaped cross section throughout its length, and as shown in FIG. 8, the slot 20 extends linearly in the direction transverse to the groove 18 or in a corrugated pattern (FIG. 8b) in terms of the plan view. On the other hand, the depth of the slot 20 may follow a saw-tooth or corrugated pattern in its plan view, as far as the depth of the slot is in the aforesaid numerical range.

The slots having the aforesaid length, depth, pitch and configuration may be formed in a tire, at a time of vulanization molding of the tire, by using a mold, in which such indentations are provided beforehand. Alternatively, such slots may be provided according to a suitable method, after the vulcanization of a tire.

With a tire of a rib type, cracks tend to take place in the grooves in the circumferential direction of a tire, while the growth of cracks are promoted at positions, in which large stress concentration takes place. However, as has been described earlier, slots 20 are provided in the grooves in the direction transverse to the grooves, i.e., in the direction at a right angle to the direction of cracks, so that the aforesaid influence of the stress may be neutralized to a great extent. This is particularly effective in the case where the end of a crack approaches the slot 20 due to its growth, and as a result the growth of the crack may be suppressed. Furthermore, when the end of a crack reaches a slot, the growth of the crack may be stopped at the slot. Another advantage of the slots which are placed at a desirable pitch as close as 5 to 20 mm is that there may be achieved a satisfactory distribution of stresses, so that not only the growth of cracks may be stopped, but also the development of cracks themselves may be suppressed to a great extent.

Table 1 compares the result of tests given to tires having slots in the tread grooves with those of tires free of such slots The dimensions of the tires used in the aforesaid tests are as follows:

```
size                                        10.00 to 20
depth of groove                             18 mm
distance D from the bottom of the groove
to the top boundary of the breaker
                                            8 mm
type of tread pattern                       rib type
The dimensions of slots are given as follows:
    length (l)                              10 mm
    width (w)                               1 mm
    depth (d)                               0 mm (Sample 1),
                                            0.5 mm (Sample 2),
                                            1.0 mm (Sample 3),
                                            3.0 mm (Sample 4)
    pitch                                   9 mm
```

The aforesaid slots extend in the direction at a right angle to the lengthwise direction of grooves.

The length of the initial crack was 6 mm and the crack was artificially provided in the direction in parallel with the length of the groove.

The tire was mounted on a rotary drum and rotated at a peripheral speed of 60 km/h under the conditions of a tire load of 2,700 kg and tire air pressur of 8 kg/cm².

Table 1

| | (Lengths of cracks at varying running distance) | | | |
|---|---|---|---|---|
| Running distance (km) | Sample 1 d=0 mm | Sample 2 d=0.5 | Sample 3 d=1.0 mm | Sample 4 d=3.0 mm |
| | | mm | | |
| 0 | 6.0 | 6.0 | 6.0 | 6.0 |
| 2,000 | 8.5 | 8.2 | 8.0 | 7.2 |
| 5,000 | 9.9 | 9.0 | 8.8 | 7.7 |
| 10,000 | 11.2 | 9.8 | 9.0 | 8.9 |

Table 1-continued (Lengths of cracks at varying running distance)

| Running distance (km) | Sample 1 d=0 mm | Sample 2 d=0.5 mm | Sample 3 d=1.0 mm | Sample 4 d=3.0 mm |
|---|---|---|---|---|
| | | mm | | |
| 15,000 | 14.3 | 12.5 | 9.2 | 9.0 |
| 20,000 | 18.0 | 16.0 | 10.5 | 9.0 |

As is apparent from Table 1, the crack grew to a length of 9.9 mm at a running distance of 5,000 km in the case of the sample 1 which was free of slots. In contrast thereto, in the case of the sample 2 having slots of a depth of 0.5 mm, the length of the crack was found to be 9.0 mm at a running distance of 5,000 km. In this respect, it should be noted that the aforesaid length (9 mm) of the crack is equal to the pitch (9 mm) of the slots, thus proving that the growth of the crack has been stopped at the position of the slot.

It was at a running distance of 10,000 km, when the length of a crack in sample 2 grew to the length of 9.8 mm close to the length 9.9 mm which was the length of the crack taking place in the sample 1 at a running distance of 5,000 km. In the case of the sample 3 having an initial crack of a depth of 1.0 mm, the length of the crack was found to be 9.0 mm at a running distance of 10,000 km, while in the case of the sample 4 having an initial crack of a depth of 3.0 mm, the length of the crack was proved to be 9.0 mm even at a running distance of 20,000 km, thus indicating the stoppage of growth of a crack within the pitch of the slots. This apparently substantiates that the growth of a crack is effectively stopped by the provision of slots.

While the features of the present invention have been described with reference to pneumatic tires having a tread pattern of a rib type, the present invention may also be applied to the pneumatic tires having a tread pattern of a lug type. With the lug type tire, cracks develop in the widthwise direction of the tire, while the force to promote the growth of cracks acts in the circumferential direction of the tire, unlike the case with the rib type tire. For this reason, the slots 20 provided in the bottom portions of grooves 18 in the transverse direction of the grooves as shown in FIG. 9 extend in the circumferential direction of the tire 10. The length, depth, width, shapes in cross section and plan view of slots are the same as those shown in FIG. 1 to 8.

What is claimed is:

1. A pneumatic tire provided with a tread defined by walls having grooves therein and a reinforcing layer placed under said tread, characterized in that said grooves are provided with a plurality of slots in their bottom portions, said slots extending in the direction at a right angle to the lengthwise direction of said grooves, said slots extending completely about the bottom of said grooves up to the mid-point of the walls of said groove through corner and center portions of the bottom portion of the groove for preventing the growth of cracks created in said bottom portion, the depth of said slots being not more than 4/5 the distance covering from the bottom surface of said groove to the top boundary of said reinforcing layer but not less than 1 mm, the width of said slots being not more than 2 mm, and the pitch of said slots being not more than 20 mm but not less than 5 mm.

2. A pneumatic tire as set forth in claim 1, wherein said slots extend linearly in its plan view.

3. A pneumatic tire as set forth in claim 1, wherein said slots extend relative to one another in a corrugated pattern in plan view.

* * * * *